United States Patent
Gomes et al.

(10) Patent No.: US 8,303,751 B2
(45) Date of Patent: Nov. 6, 2012

(54) METHOD FOR INTEGRAL VENT SCREEN IN MOLDED PANELS

(75) Inventors: Gerald J. Gomes, Macomb, MI (US);
Paul E. Krajewski, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 93 days.

(21) Appl. No.: 12/871,816

(22) Filed: Aug. 30, 2010

(65) Prior Publication Data
US 2012/0048457 A1     Mar. 1, 2012

(51) Int. Cl.
*B29C 70/76* (2006.01)
*B32B 3/10* (2006.01)

(52) U.S. Cl. .......... 156/245; 156/307.7; 428/137; 428/138; 454/142; 454/241

(58) Field of Classification Search .......... 454/142, 454/241; 237/46; *B29C 70/72, 70/74, 70/76*
See application file for complete search history.

(56) References Cited

U.S. PATENT DOCUMENTS

| | | | | |
|---|---|---|---|---|
| 2,015,087 A | * | 9/1935 | Rafton | 209/403 |
| 3,362,316 A | * | 1/1968 | Hans Froitzheim et al. | 454/144 |
| 4,728,422 A | * | 3/1988 | Bailey | 210/314 |
| 6,139,426 A | * | 10/2000 | Koerber | 454/296 |

FOREIGN PATENT DOCUMENTS

| | | | | |
|---|---|---|---|---|
| JP | 63004917 A | * | 1/1988 | |
| JP | 2002046136 A | * | 2/2002 | |

OTHER PUBLICATIONS

Peters, S.T., Handbook of Composites, Second Edition, 1998, pp. 352-366 and 433-444.*

* cited by examiner

*Primary Examiner* — William Bell

(57) ABSTRACT

A fiber reinforced panel is manufactured to include an integral vent screen. Holes are made in each of first and second sheets of fiber and the holes register with each other when the sheets are stacked within a mold. A screen material is placed between the first and second sheets so that a part of the screen material that registers with the holes in the first sheet and second sheet is exposed. Filler inserts are inserted into the holes of the first and second sheets to mask the screen. A resin is provided and cured to bond together the first and second sheets and the screen. Thus, the screen remains exposed after the first and second sheets and screen have been bonded together by the resin, thereby forming a fiber reinforced panel having an integrally molded vent screen therein.

14 Claims, 4 Drawing Sheets

METHOD FOR INTEGRAL VENT SCREEN IN MOLDED PANELS

FIELD OF THE INVENTION

The present invention relates to the manufacture of fiber reinforced panels and more particularly provides a method by which a vent screen is integrally molded into a fiber reinforced panel such as a vehicle hood or fender.

BACKGROUND OF THE INVENTION

It is known to manufacture vehicle body panels, such as a vehicle hood or a vehicle fender, of laminated fiber reinforced construction in which sheets of carbon fiber or glass fiber are placed in a mold and bonded together with resin. The fiber sheets can be pre-impregnated with the resin. Or, the resin can be provided by injection into the mold, commonly referred to as resin transfer molding or resin injection molding.

In the styling of motor vehicles it is often desirable to provide a vent opening in the panel. The vent may be an actual intake for cooling air, or the vent may simply create the appearance of an actual vent in order to enhance the vehicle design. Heretofore, the provision of such a vent would involve making a hole in the vehicle panel and then attaching a separate vent screen onto the vehicle panel to fill the hole. The vent screen would typically be of molded plastic or stamped metal construction and include actual or simulated air openings or louvers. The vent screen is attached to the vehicle panel via rivets, adhesive, screws, flexible tabs, or other conventional fasteners.

It would be desirable to provide an improved method by which a vent screen could be integrally molded into a fiber reinforced panel such as a vehicle hood or fender.

SUMMARY OF THE INVENTION

A fiber reinforced panel is manufactured to include an integral vent screen. Holes are made in each of first and second sheets of fiber and the holes register with each other when the sheets are stacked within a mold. A screen material is placed between the first and second sheets so that a part of the screen material that registers with the holes in the first sheet and second sheet is exposed. Filler inserts are inserted into the holes of the first and second sheets to mask the screen. A resin is provided and cured to bond together the first and second sheets and the screen. Thus, a part of the screen remains exposed after the first and second sheets and screen have been bonded together by the resin, thereby forming a fiber reinforced panel, having an integrally molded vent screen therein.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is merely exemplary in nature and is not intended to limit the invention, its application, or uses.

Figure 20:
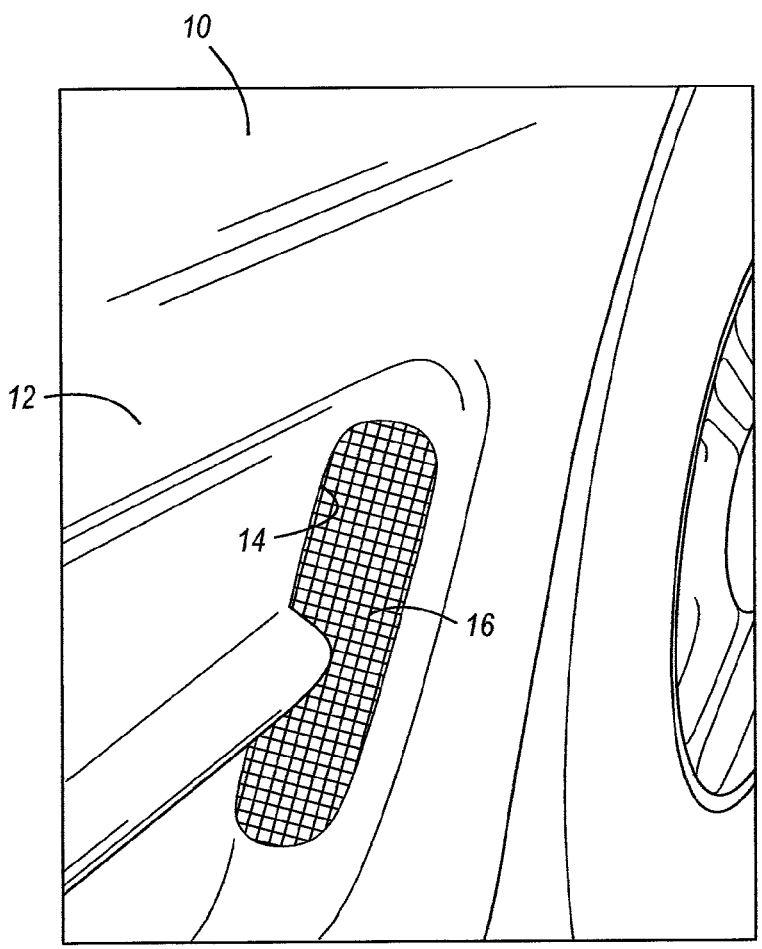
FIG. 20 is a perspective view of the vehicle fender having an integral vent screen according to the invention.

Referring to FIG. 20, a portion of a vehicle panel 10, particularly a fender 12, is shown. The fender 12 is made of laminated fiber and plastic construction and has a vent opening 14 provided therein. A vent screen 16 is mounted in the vent opening 14. The vent screen 16 can be an open weave material that actually allows air flow through the fender 12, for example to cool the tires. Or, the vent screen 16 can have the appearance of vent openings therein for vehicle styling purposes rather than functioning as an actual vent.

FIGS. 1-14 show a first embodiment of a method for the manufacture of the vehicle body panel 12 with the vent screen 16 formed integrally therewith. For purposes of clarity and simplification, the description and drawings of the embodiment of FIGS. 1 through 14 will show the manufacture of a simple planar panel, it being understood that the manufacturing process would be performed in a more complexly shaped mold in order to make an actual vehicle panel, such as the fender 12. In addition, it will be understood that the FIGS. 1 through 14 are not drawn to scale and the thickness of the various components is exaggerated for clarity.

Figure 1:
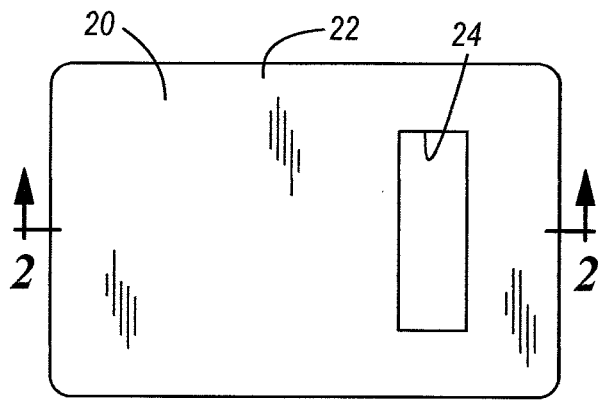
FIG. 1 is a plan view showing a first sheet of fiber material.

Referring to FIG. 1, a first sheet of fiber 20 is provided. The sheet of fiber 20 can be of glass or carbon material that can be of continuous strand, woven, bonded fiber, chopped strand, or other commercially available fiber sheet materials. The first sheet 20 preferably includes a pre-impregnated resin 22. In modern manufacturing, the pre-impregnated fiber sheet is customarily manufactured at a production facility where the laminate is precisely manufactured so that the resin volume can be controlled very closely to provide a highly consistent pre-impregnated fiber material. Pre-impregnated fiber material is customarily shipped in rolls and may be refrigerated in order to prevent an inadvertent curing of the resin.

Figure 2:
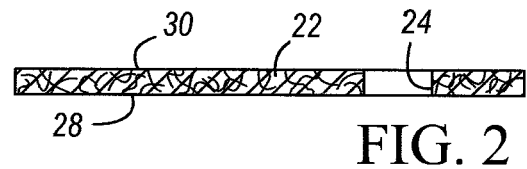
FIG. 2 is a section view taken in the direction of arrows 2-2 of FIG. 1.

FIG. 1 shows that the pre-impregnated sheet 20 has been cut or blanked to define a generally rectangular sheet having a hole 24 provided therein. FIG. 2 is a section view taken through the sheet 20 showing the hole 24 and also showing that the sheet 20 has an outer face 28 and an inner face 30.

Figure 3:
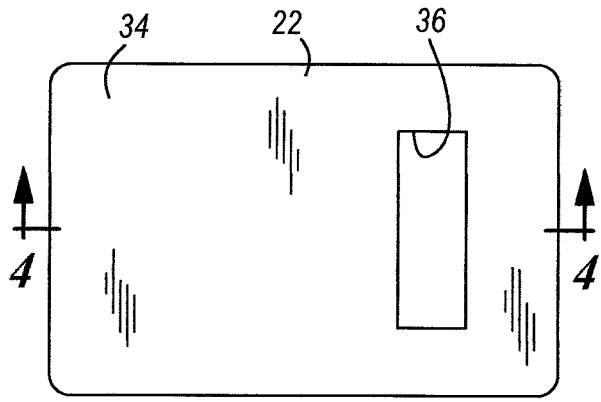
FIG. 3 is a plan view showing a second sheet of fiber material.
Figure 4:
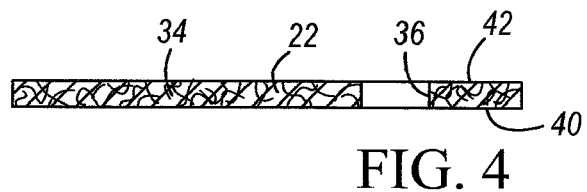
FIG. 4 is a section view taken in the direction of arrows 4-4 of FIG. 3.

FIG. 3 shows a second sheet of pre-impregnated fiber material 34, which is the same shape as the first sheet 20 of FIG. 1, and includes a hole 36 that is of the same shape and size as the hole 24 of the first sheet 20. FIG. 4 shows a section view through the second sheet 34 including hole 36 and showing that the second sheet 34 has a front side 40 and a back side 42.

Figure 5:
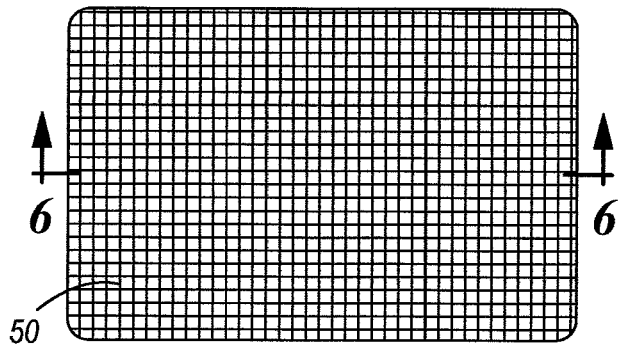
FIG. 5 is a plan view of a piece of screen material.
Figure 6:
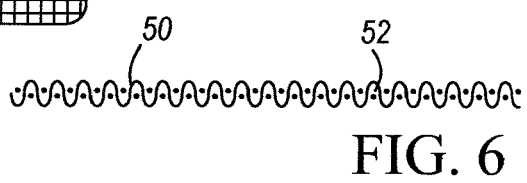
FIG. 6 is a section view taken in the direction of arrows 6-6 of FIG. 5.

FIG. 5 is a plan view of a sheet of screen material 50 that is rectangular in shape and is the same size as the first sheet 20 and the second sheet 34. FIG. 6 is a section view through the screen 50 and shows that the screen 50 has vent holes 52 therethrough to enable the flow of air through the screen 50. The screen can be a flexible material of woven metal or plastic strands. Alternatively, the screen can be a sheet of metal or plastic which is punched or stamped to provide vent holes or louvers therein. Or, the screen can be a sheet of woven or needle punched plastic or textile material. Or, the screen can be molded plastic. Thus, it will be understood that the screen 50 can be manufactured of any material and any method that will provide the desired appearance of a functioning vent screen or a decorative vent screen. The vent holes can actually pass all the way through the screen 50 or can merely be louvers or other shapes that create the appearance of a vent screen.

Figure 7:
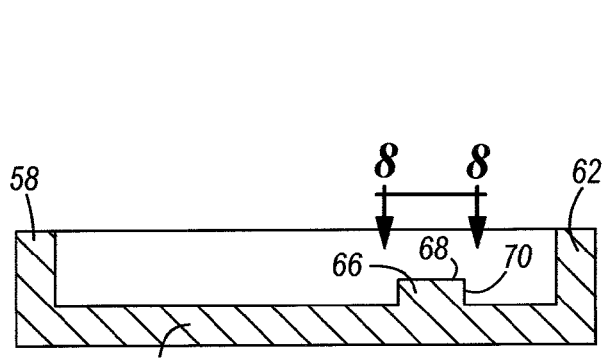
FIG. 7 is a section view taken through a mold.
Figure 8:
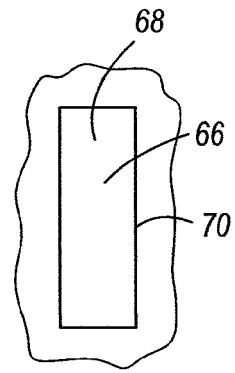
FIG. 8 is of plan view of a fragment of the mold of FIG. 7 taken in the direction of arrows 8-8 of FIG. 7.

FIG. 7 is a cross section view taken through a mold 58. The mold 58 is generally is the shape of an open top box and includes a mold floor 60 and a mold sidewall 62 that stands upwardly from the mold floor 60 all around the edges of the mold floor 60. As seen in FIGS. 7 and 8, the mold 58 includes a mold insert 66 that rises from the mold floor 60 and is the same size as the hole 24 in the first sheet 20. Mold insert 66 has a top surface 68 and sidewalls 70.

Figure 9:
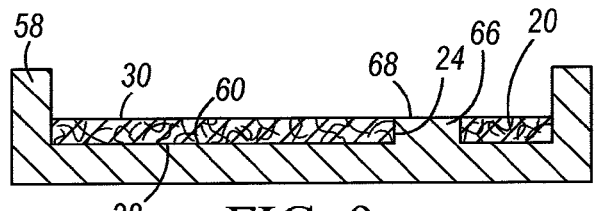
FIG. 9 is a section view showing the first sheet of FIG. 1 laid in the mold.

Referring to FIG. 9, it is seen that the first sheet 20 is laid into the mold 58 so that the outer wall 28 of the first sheet 20 is now resting upon the bottom wall 60 of the mold 58. The insert 66 of the mold 58 is projecting through the hole 24 of the first sheet 20 and the top surface 68 of the mold insert 66 is flush with the inner face 30 of the first sheet 20.

Figure 10:
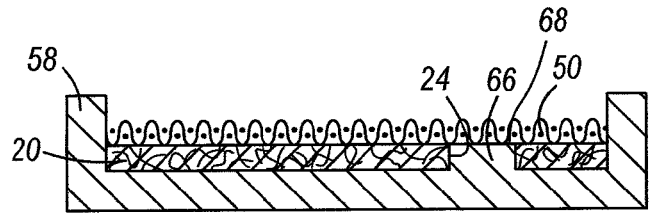
FIG. 10 is a section view showing the screen material of FIG. 5 laid in the mold.

Referring to FIG. 10, the next step in the process is that the screen 50 of FIG. 5 is laid atop the first sheet 20 and the top surface 68 of the mold insert 66.

Figure 11:
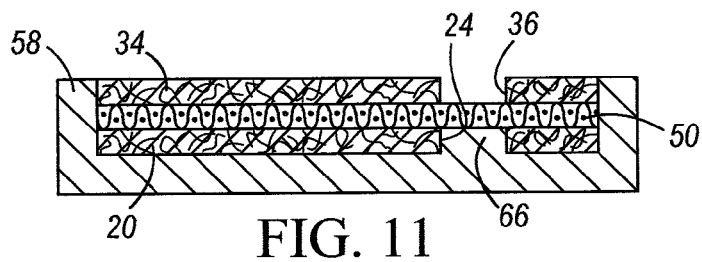
FIG. 11 is a section view showing the second sheet of FIG. 3 laid in the mold.

Then, in FIG. 11, the second sheet 34 is laid atop the screen 50 and it is seen that the hole 36 of the second sheet 34, is registered with the hole 24 of the first sheet 20.

Figure 13:
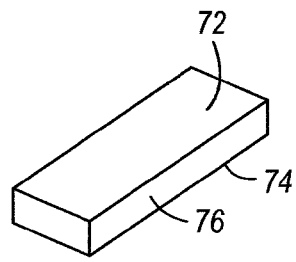
FIG. 13 is a perspective view of the insert.
Figure 12:
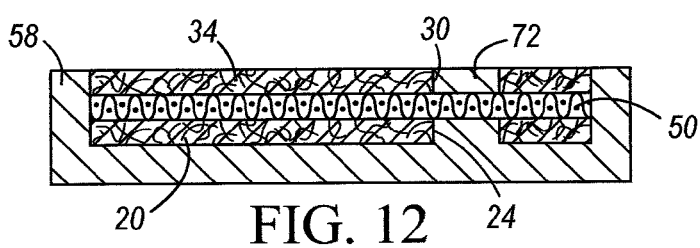
FIG. 12 is a section view showing an insert laid in the mold.

In FIG. 12, a rectangular shaped insert 72, best shown in FIG. 13, has been inserted into the hole 36 of the second sheet 34 and has a bottom wall 74 that rests upon the screen 50 and sidewalls 76 that fit with the hole 36 of the second sheet 34.

After the components have been installed in the mold, as shown in FIG. 12, the mold 58 is ready to be heated in order to cure the resin of the pre-impregnated sheets 20 and 34.

With heating of the mold in an oven, the resin 22 impregnated in the first sheet 20 and second sheet 34 will be cured and bond together the laminate of the first sheet 20, the screen 50 and the sheet 34. The presence of the insert 66 will prevent the resin 22 from flowing into the hole 24 and the top surface 68 will prevent the resin 22 from flowing into that part of the screen 50 that overlies the top surface 68. In addition, the resin 22 will flow against the side walls 70 of the insert 66 and thereby form a finished edge for hole 36. Likewise, the presence of the insert 72 will prevent the resin 22 from flowing into the hole 36 of second sheet 34. The bottom wall 74 of the insert 72 will prevent the resin 22 from flowing into that part of the screen 50 that overlies the top surface 68. In addition, the resin 22 will flow against the sidewalls 76 of the insert 72 and thereby form a finished edge for hole 36. Thus, the inserts 66 and 72 act as masks to mask parts of the screen 50 that register with the holes 24 and 36 to prevent that part of the screen 50 from being filled with resin 22.

Figure 14:
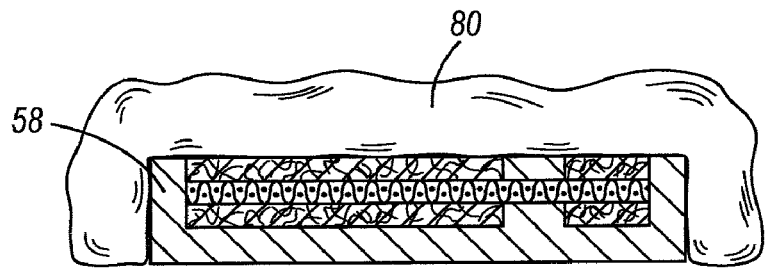
FIG. 14 is a section view showing a bag that applies pressure to the mold.

Referring to FIG. 14, an inflatable bag 80 has been installed atop the mold 60 and will be pressurized in order to apply pressure to the mold 58. The pressure will compact the stacked sheets within the mold 58 in order to aid in the curing process and provide a high quality finished part. The bag 80 can be a pressurized bag or a vacuum bag arrangement.

Figure 15:
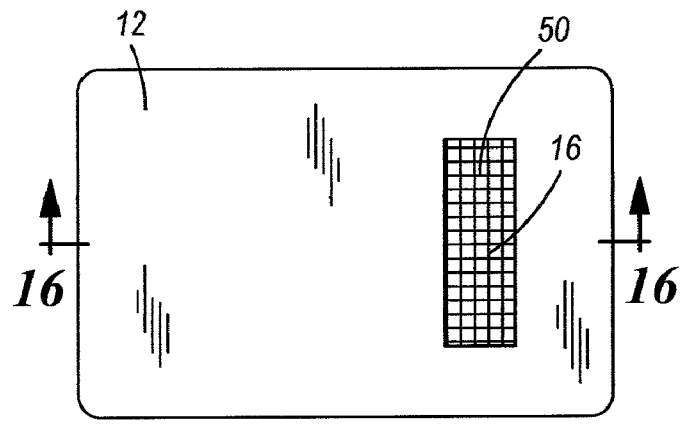
FIG. 15 shows a finished part with integral vent screen.
Figure 16:
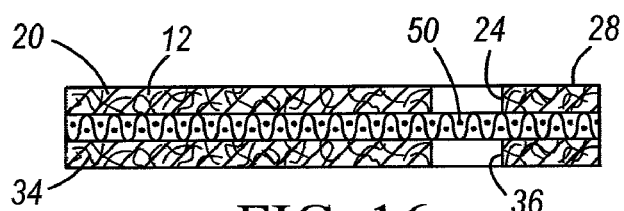
FIG. 16 is a section view of the finished part taken in the direction of arrows 16-16 of FIG. 15.

In FIGS. 15 and 16, the finished part, such as fender 12 of FIG. 20 is shown, and has been removed from the mold 58 and turned over. The resin is fully cured and the hole 24 of the first sheet 20 is registered with the hole 36 of the second sheet 34 so that a portion of the screen 50 is exposed and visible through the holes 24 and 36, and thereby becomes the vent screen 16 of the finished panel fender 12. The outer surface 28 of the first sheet 20 will be the outer face of the finished panel 12, such as the fender 12 and will thus have a high quality surface ready for painting.

Thus, the invention has provided a method for providing an integral vent screen within a molded vehicle panel of fiber reinforced plastic laminate construction. And the screen 50, by being coextensive in size with the sheets 20 and 34 serves to reinforce the finished part, particularly as the resin 22 will flow into the vent openings of the screen 50 except in those areas that are masked by the inserts 66 and 72.

Figure 17:
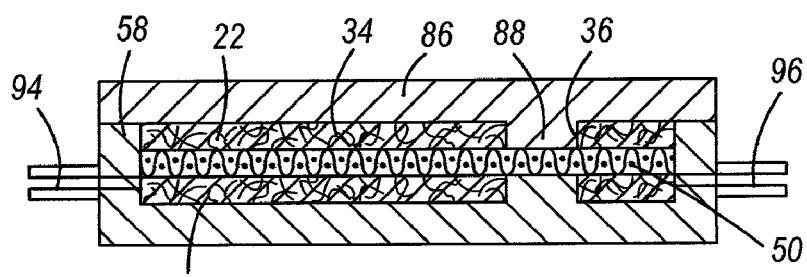
FIG. 17 shows another embodiment of the invention in which the mold has a lid.
Figure 19:
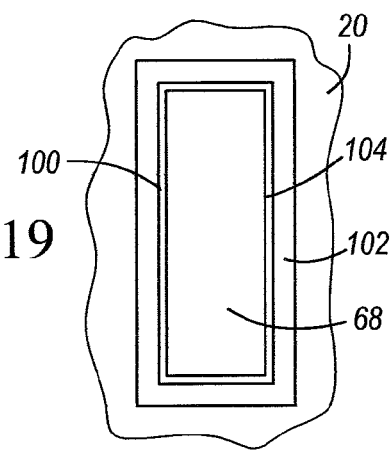
FIG. 19 is a plan view of the trim ring.

Referring to FIG. 17, an additional embodiment of the invention is shown. FIG. 17 is like FIG. 12 except that it is seen that the mold 58 has a lid 86 that closes over top of the mold 58 and applies some pressure onto the stacked sheets. The lid 86 has an insert 88, similar to the insert 72 of FIG. 12, so that upon closure of the lid 86 the insert 88 will enter into the hole 36 of the sheet 34. FIG. 19 also shows inlet ports 94 and 96 provided in the mold 58 for the injection of resin into the mold. Thus, in the embodiment of FIGS. 1 through 12, the resin had been pre-impregnated into the sheets 20 and 34. In contrast, in the embodiment of FIG. 17, the resin is injected into the mold in which case the sheets 20 and 34 are simply mats of fiber material without the pre-impregnated resin.

Figure 18:
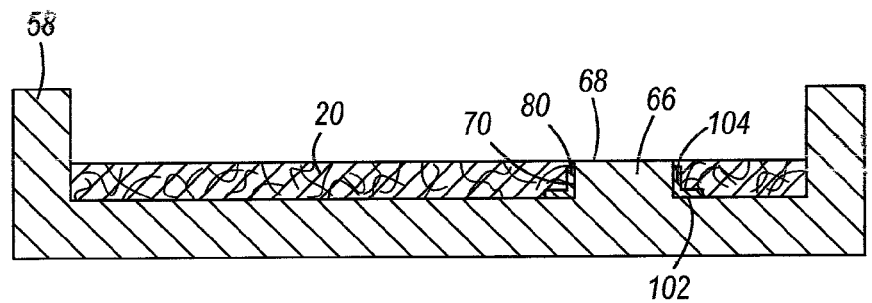
FIG. 18 is a view similar to FIG. 9 but showing that an annular trim ring has been laid into the mold prior to the first sheet being laid into the mold.

Another embodiment of the invention is shown in FIGS. 18 and 19. In FIG. 19, an annular trim ring 100 is shown which may be of molded plastic or metal and may have chrome plating or other decorative finish. As seen in FIG. 18, the trim ring 100 is laid into the mold 58 prior to placing the first sheet 20 into the mold 58. The trim ring 100 has a face portion 102 that rests upon the floor 60 of the mold 58 and a flange leg 104 that engages the side walls 70 of the insert 66. Thereafter, the screen 50 will be added and the second sheet 34 and the insert 72 will be installed as described hereinabove in relation to the first embodiment. Then, when the resin 22 is cured, the trim ring 100 will be adhered into the finished part so that the trim ring 100 will provide a decorative frame surrounding the vent opening of the finished part.

The drawings herein show the screen 50 as being co-extensive in size with the fiber sheets 20 and 34. However, it will be understood that the screen 50 may be smaller than the sheets 20 and 34, but larger than the size of the holes 24 and 36 so that the screen 50 overlaps onto the sheets 20 and 34.

Although the drawings herein show just the two fiber sheets 20 and 34, additional sheets with vent forming holes 24 and 36 therein can be employed to build up a laminated panel of greater thickness and strength.

Furthermore, any of the known methods for curing the resin may be employed. For example, the mold 58 of FIG. 12 can be placed in an autoclave so that heat and pressure can be employed. Or, the mold can be heated by being placed in an oven or by circulating hot water through the mold.

What is claimed is:

1. A method for manufacturing a fiber reinforced panel to include an integral vent screen, comprising:
   providing at least a first sheet of fiber;
   providing at least a second sheet of fiber;
   making holes in each of the first and second sheets that will register with each other when the sheets are stacked together;
   placing the first sheet in a mold, said mold having a floor mold surface on which the first sheet rests and a raised insert that rises from the mold surface and extends through the hole in the first sheet;
   providing an annular decorative trim ring and placing the trim ring about the insert on the mold prior to placing the first sheet into the mold;
   providing a sheet of screen material having openings therein and placing the sheet of screen material atop the first sheet and the insert;
   placing the second sheet atop the sheet of screen material with the hole in the second sheet registering with the hole in the first sheet;
   and curing a resin so that the first and second sheets are bonded together with the sheet of screen material bonded therebetween and exposed within registered holes of the first and second sheets to provide an integral vent screen and so that upon curing of the resin the trim ring is bonded to the first sheet to surround the hole in the first sheet.

2. The method of claim 1 further comprising: providing at least the first and second sheets being coextensive in size.

3. The method of claim 1 further comprising: the sheet of screen material being of lesser size than the first and second sheets but larger than the registered holes of the first and second sheets so as have edges that overlap onto the first and second sheets surrounding the registered holes.

4. The method of claim 1 further comprising the sheet of screen material being a screen woven of metal or plastic strands, a sheet of metal or plastic punched to provide vent holes therein, or a sheet of woven or needle punched plastic or textile material.

5. The method of claim 1 further comprising the resin being provided by pre-impregnating the first and second sheets of fiber with resin.

6. The method of claim 1 further comprising the resin being provided by injecting the resin into the mold.

7. The method of claim 1 further comprising the mold having a lid and the lid having thereon an insert that upon closing of the lid will fill the hole in the second sheet.

8. The method of claim 7 further comprising: the sheet of screen material being coextensive in size with the first and second sheets.

9. The method of claim 1 further comprising the resin being cured by heating of the mold.

10. The method of claim 1 further comprising the resin being cured in an autoclave to provide heat and pressure.

11. The method of claim 1 further comprising the first and second sheets being of a carbon fiber or a glass fiber.

12. A method for manufacturing a fiber reinforced panel to include an integral vent screen, comprising:
    providing one or more first sheets of resin impregnated carbon fiber;
    providing one or more second sheets of resin impregnated carbon fiber;
    making holes in each of the one or more first and second sheets that will register with each other when the sheets are stacked together;
    placing the first sheets in a mold, said mold having a mold floor surface on which the first placed of the first sheets rests and a raised insert that rises from the mold surface and extends through the holes in the one or more first sheets;
    providing a sheet of screen material having real or simulated vent openings therein and placing the sheet of screen material atop the topmost of the one or more first sheets and the insert;
    placing the one or more second sheets atop the sheet of screen material with the holes in the one or more second sheets registering with the holes in the one or more first sheets;
    curing the resin so that the first and second sheets are bonded together with the sheet of screen material bonded therebetween and exposed within registered holes of the first and second sheets to provide an integral vent screen, and;
    providing an annular decorative trim ring and placing the trim ring about the insert on the mold prior to placing the first sheet into the mold so that upon curing of the resin the trim ring is bonded to the first sheet to surround the hole in the first sheet.

13. The method of claim 12 further comprising: placing an insert into the hole in the second sheet so that upon curing the resin, the insert will prevent the flow of resin into the hole of the second sheet and into a part of the screen material registered with the hole in the second sheet.

14. The method of claim 12 further comprising: providing the at least first and second sheets coextensive in size with each other and providing the screen of a size that is either coextensive in size with the first and second sheets or smaller than the size of the first and second sheets but larger than the size of the holes in the first and second sheets.

* * * * *